United States Patent
Kobayashi et al.

(10) Patent No.: US 7,837,872 B2
(45) Date of Patent: Nov. 23, 2010

(54) ADSORBENT, ADSORPTION APPARATUS, AND METHOD FOR MANUFACTURING THE ADSORPTION APPARATUS

(75) Inventors: Shintaro Kobayashi, Saitama (JP); Tomohiko Yoshitake, Tokyo (JP); Naomi Masuzawa, Saitama (JP); Tsuneo Okuyama, 39-1533, Sakuradai, Aoba-ku, Yokohama-shi, Kanagawa 227-0061 (JP)

(73) Assignees: Hoya Corporation, Tokyo (JP); Tsuneo Okuyama, Yokohama-shi (JP)

( * ) Notice: Subject to any disclaimer, the term of this patent is extended or adjusted under 35 U.S.C. 154(b) by 1035 days.

(21) Appl. No.: 11/368,668

(22) Filed: Mar. 7, 2006

(65) Prior Publication Data

US 2006/0207940 A1 Sep. 21, 2006

(30) Foreign Application Priority Data

Mar. 7, 2005 (JP) ............................. 2005-062990

(51) Int. Cl.
*B01D 15/08* (2006.01)
*C02F 1/28* (2006.01)
*H01B 1/02* (2006.01)

(52) U.S. Cl. ................... 210/198.2; 210/656; 252/521.1

(58) Field of Classification Search ................. 210/656, 210/198.2
See application file for complete search history.

(56) References Cited

U.S. PATENT DOCUMENTS

| | | | | |
|---|---|---|---|---|
| 4,325,742 A | * | 4/1982 | Arena | 127/46.2 |
| 5,039,408 A | * | 8/1991 | Ichitsuka et al. | 210/198.2 |
| 5,280,492 A | * | 1/1994 | Krupke et al. | 372/41 |
| 5,341,389 A | * | 8/1994 | Payne et al. | 372/41 |
| 5,407,659 A | * | 4/1995 | Deutsch et al. | 424/9.32 |
| 5,540,995 A | * | 7/1996 | Kitano et al. | 428/407 |
| 6,459,010 B1 | * | 10/2002 | Carpena et al. | 588/10 |
| 7,704,529 B2 | * | 4/2010 | Riman et al. | 424/602 |

FOREIGN PATENT DOCUMENTS

JP 8-211041 8/1996

OTHER PUBLICATIONS

English Language Abstract of JP 8-211041.

(Continued)

*Primary Examiner*—Krishnan S Menon
*Assistant Examiner*—Katherine Zalasky
(74) *Attorney, Agent, or Firm*—Greenblum & Bernstein, P.L.C.

(57) ABSTRACT

An adsorption apparatus comprising a column filled with an adsorbent, wherein the surface of the adsorbent and its vicinity mainly comprise an apatite which is represented by the formula $(Ca_{1-a}M_a)_{10}(PO_4)_6((OH)_{1-b}X_b)_2$, where the M represents at least one kind of rare earth metal elements, the X represents at least one kind of halogen elements, $0<a\leq1$, and $0\leq b\leq1$. Preferably, the M comprises a lanthanide-based metal element mainly comprising Sm, and the ratio of Sm is no less than 70% to the total amount of the M. The adsorbent apparatus may be manufactured by passing a solution containing ions of at least one kind of rare earth metal elements through the adsorbent filling space of the column filled with the apatite represented by the formula $Ca_{10}(PO_4)_6((OH)_{1-b}X_b)_2$, where the X represents at least one kind of halogen elements and $0\leq b\leq1$.

25 Claims, 1 Drawing Sheet

OTHER PUBLICATIONS

Suen et al., "Hydroxyapatite-based immobilized metal affinity adsorbents for protein purification," Journal of Chromatography A, vol. 1048, pp. 31-39 (2004).

Nordstrom et al., "Generation of a new protein purification matrix by loading ceramic hydroxyapatite with metal ions—demonstration with poly-histidine tagged green fluorescent protein," Journal of Biotechnology, vol. 69, pp. 125-133 (1999).

U.S. Appl. No. 10/560,077 to Kobayashi et al., filed Dec. 9, 2005.

* cited by examiner

ADSORBENT, ADSORPTION APPARATUS, AND METHOD FOR MANUFACTURING THE ADSORPTION APPARATUS

BACKGROUND OF THE INVENTION

1. Field of the Invention

The present invention relates to an adsorbent, an adsorption apparatus, and a method for manufacturing the adsorption apparatus, and more specifically relates to an adsorbent, an adsorption apparatus using the adsorbent, and a method for manufacturing the adsorption apparatus.

2. Description of the Prior Art

Hydroxyapatite has excellent biocompatibility, and has been heretofore widely used as an adsorbent in a column (i.e., in an adsorption apparatus) for liquid chromatography that adsorbs and separates a protein and the like (see, for example, JP-A No. 08-211041).

However, an adsorbent made of hydroxyapatite is low in strength and solvent resistance. The adsorbent is also disadvantageous in that a column for liquid chromatography may be prematurely clogged due to degradation of the adsorbent or other causes (namely, poor in durability). Further, the adsorbent non-specifically adsorbs various kinds of proteins, and therefore gives rise to a problem in that it has no ability to selectively adsorb a specific protein.

SUMMARY OF THE PRESENT INVENTION

In view of the above problems, it is an object of the present invention to provide an adsorbent capable of specifically adsorbing an object compound, an adsorption apparatus capable of easily and reliably separating and purifying the object compound, and a method capable of easily manufacturing such an adsorption apparatus in a shortened period of time.

In order to achieve the above object, one aspect of the present invention is directed to an adsorbent whose surface and its vicinity comprises an apatite, and more preferably mainly comprises (e.g., greater than about 50%) an apatite, the apatite represented by the following formula (I):

$$(Ca_{1-a}M_a)_{10}(PO_4)_6((OH)_{1-b}X_b)_2, \quad (I)$$

where the M represents at least one kind of rare earth metal elements, the X represents at least one kind of halogen elements, $0<a\leq 1$, and $0\leq b\leq 1$.

This ensures that an object compound (e.g., a compound with at least two noncovalent electron pairs) having a portion capable of bonding to the M with a high affinity (i.e., with a high bonding force) is specifically bonded to the adsorbent. As a result, the adsorbent can exhibit high selectivity with respect to such a compound.

In the adsorbent according to the present invention, it is preferred that the M is a rare earth metal element containing at least one kind of lanthanide-based metal elements. The lanthanide-based metal elements are easily substituted for Ca of the apatite and therefore efficiently introduced into a crystal lattice of the apatite.

In the adsorbent according to the present invention, it is also preferred that the M comprises a lanthanide-based metal element mainly comprising (e.g., greater than about 50%) Sm. This can impart a specific adsorbability to the adsorbent, thus resulting in a higher selectivity for an object compound.

In the adsorbent according to the present invention, it is also preferred that the M comprises Sm and the ratio of Sm is no less than 70% with respect to the total of the M. This ensures that the characteristics (properties) of Sm become more outstanding, thus further improving the specific adsorbability of the adsorbent.

In the adsorbent according to the present invention, it is preferred that the a in the formula (I) is in the range of 0.5 to 1. If the a is too small, there is a likelihood that the adsorbent may not be sufficiently given the specific adsorbability, depending on the kind or the like of the M.

In the adsorbent according to the present invention, it is also preferred that the X in the formula (I) is a halogen element mainly comprises (e.g., greater than about 50%) F. This can improve durability and solvent resistance (particularly, acid resistance) of the apatite (adsorbent).

In the adsorbent according to the present invention, it is preferred that the X comprises F and the ratio of F is no less than 80% with respect to the total amount of the X. This ensures that the characteristics (properties) of F become more outstanding, thus further improving durability and solvent resistance (particularly, acid resistance) of the apatite (adsorbent).

In the adsorbent according to the present invention, it is also preferred that the b in the formula (I) is in the range of 0.3 to 1. If the b is too small, there is a likelihood that the durability and the solvent resistance of the apatite (adsorbent) may not be sufficiently improved, depending on the kind or the like of the X.

In the adsorbent according to the present invention, it is also preferred that the adsorbent selectively adsorbs a compound having at least two noncovalent electron pairs. According to the adsorbent of the present invention, the M can form a chelate with the compound having at least two noncovalent electron pairs and can reliably (selectively) retain such a compound in place.

In the adsorbent according to the present invention, it is also preferred that the compound is at least one kind of a sulfur-containing amino acid, a heterocyclic amino acid, and a polypeptide having the amino acids as amino acid residues. These compounds exhibit an enhanced ability to form a chelate with the M. In this case, it is preferred that the sulfur-containing amino acid is cysteine. Cysteine has an extremely high ability to form a chelate with the M.

In the adsorbent according to the present invention, it is also preferred that the heterocyclic amino acid is histidine or tryptophan. Histidine and tryptophan have an extremely high ability to form a chelate with the M.

In the adsorbent according to the present invention, it is also preferred that the adsorbent has a particulate form. The adsorbent of a particulate form has an increased surface area, which in turn can increase an adsorption amount of the object compound. In this case, it is preferred that the average particle size of the particulate adsorbent is in the range of 0.5 to 150 μm. Use of the adsorbent having such an average particle size makes sure that, in the case where an adsorption apparatus is provided with a filter member, the adsorbent has a sufficiently great surface area while the filter member is surely prevented from clogging.

Another aspect of the present invention is directed to an adsorption apparatus comprising a column having an adsorbent filling space and an adsorbent filled in at least a part of the adsorbent filling space.

This makes it possible to easily and reliably separate and purify a compound (object compound) having a portion excellent in the ability to form a chelate with the M. That is to say, it is possible to collect the compound in a high yield and with an increased purity.

In the adsorption apparatus according to the present invention, it is preferred that the adsorbent filling space is substantially fully filled with the adsorbent. Such a structure makes it possible to further enhance the ability to separate and purify an object compound.

In the adsorption apparatus according to the present invention, it is also preferred that the adsorbent has substantially identical composition in each and every part of the adsorbent filling space. This makes the ability to separate and purify an object compound particularly excellent.

A further aspect of the present invention is directed to a method for manufacturing an adsorption apparatus, comprising the steps of:

preparing a column having an adsorbent filing space which is filled with an apatite represented by the formula $Ca_{10}(PO_4)_6((OH)_{1-b}X_b)_2$, where the X represents at least one kind of halogen elements and $0 \leq b \leq 1$;

preparing a solution containing ions of at least one kind of rare earth metal elements; and passing the solution through the adsorbent filling space of the column filled with the apatite to thereby make at least a part of a surface and its vicinity of the apatite have the following formula (I):

$$(Ca_{1-a}M_a)_{10}(PO_4)_6((OH)_{1-b}X_b)_2, \quad (I)$$

where the M represents at least one kind of rare earth metal elements, the X represents at least one kind of halogen elements, $0 < a \leq 1$, and $0 \leq b \leq 1$.

This makes it possible to manufacture an adsorption apparatus with ease and within a shortened period of time.

A still further aspect of the present invention is directed to a method for manufacturing an adsorption apparatus, comprising the steps of:

preparing a column having an adsorbent filing space which is filled with an apatite represented by the formula $Ca_{10}(PO_4)_6(OH)_2$;

preparing a solution containing ions of at least one kind of rare earth metal elements, and a solution containing ions of at least one kind of halogen elements; and passing the solutions through the adsorbent filling space of the column filled with the apatite one after another or substantially at the same time to thereby make at least a part of a surface and its vicinity of the apatite have the following formula (I):

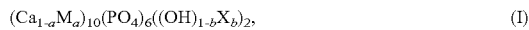
$$(Ca_{1-a}M_a)_{10}(PO_4)_6((OH)_{1-b}X_b)_2, \quad (I)$$

where the M represents at least one kind of rare earth metal elements, the X represents at least one kind of halogen elements, $0 < a \leq 1$, and $0 \leq b \leq 1$.

This also makes it possible to manufacture an adsorption apparatus with ease and within a shortened period of time.

In the method for manufacturing an adsorption apparatus according to the present invention, it is preferred that the amount of the halogen element ions contained in 1 L of the solution containing the halogen element ions is in the range of 0.2 to 200 mol based on 1 mol of the apatite. This makes it possible that a hydroxyl group of the apatite is efficiently substituted by the halogen group.

In the method for manufacturing an adsorption apparatus according to the present invention, it is also preferred that the total pass-through quantity of the solution containing the halogen element ions is in the range of 1 to 50 mL. This also makes it possible that a hydroxyl group of the apatite is efficiently substituted by the halogen group.

In the method for manufacturing an adsorption apparatus according to the present invention, it is also preferred that the flow rate of the solution containing the halogen element ions is in the range of 0.1 to 10 mL/min. This also makes it possible that a hydroxyl group of the apatite is efficiently substituted by the halogen group.

In the method for manufacturing an adsorption apparatus according to the present invention, it is also preferred that the amount of the rare earth metal element ions contained in 1 L of the solution containing the rare earth metal element ions is in the range of 1 to 200 mol based on 1 mol of the apatite. This also makes it possible that Ca of the apatite is efficiently substituted by the M.

In the method for manufacturing an adsorption apparatus according to the present invention, it is also preferred that the total pass-through quantity of the solution containing the rare earth metal element ions is in the range of 1 to 50 mL. This makes it possible that Ca of the apatite is efficiently substituted by the M.

In the method for manufacturing an adsorption apparatus according to the present invention, it is also preferred that the flow rate of the solution containing the rare earth metal element ions is in the range of 0.1 to 10 mL/min. This makes it possible that Ca of the apatite is efficiently substituted by the M.

These and other objects, structures and results of the present invention will become more apparent when the following detailed description of the preferred embodiment is considered taken in conjunction with the appended drawings.

DETAILED DESCRIPTION OF THE PREFERRED EMBODIMENTS

Figure 1:
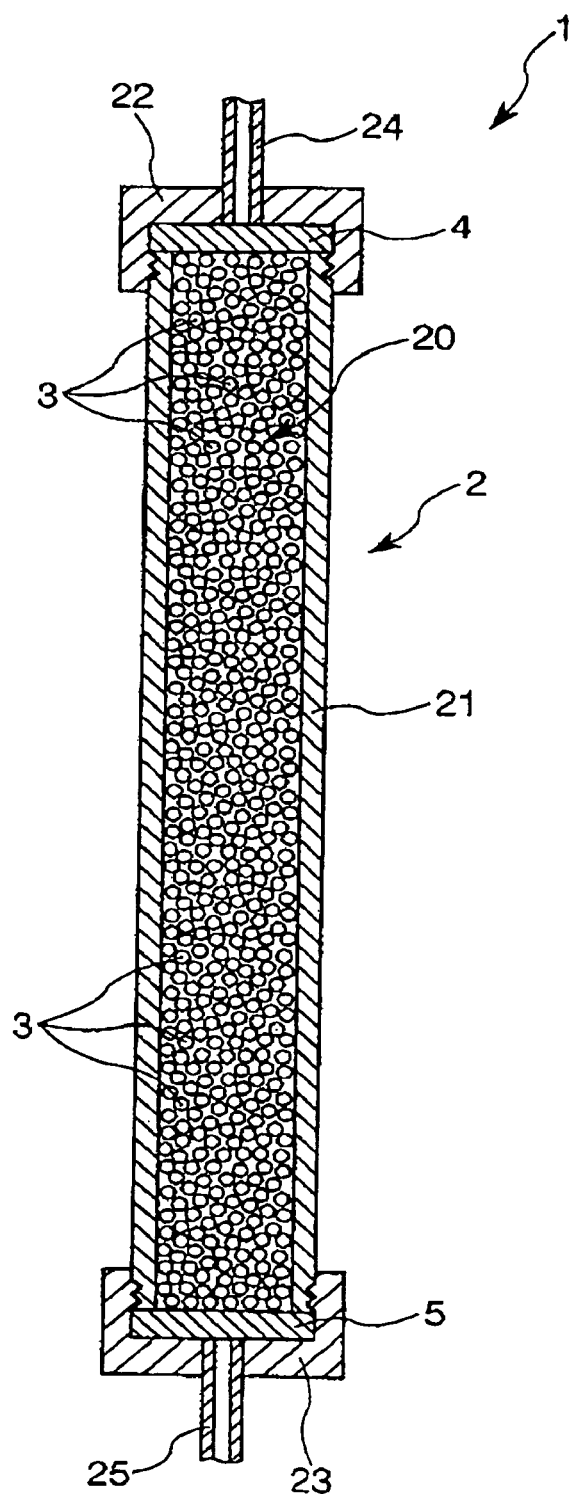
FIG. 1 is a cross-sectional view showing an adsorption apparatus according to an embodiment of the present invention.

Hereinbelow, an adsorbent, an adsorption apparatus, and a method for manufacturing the adsorption apparatus according to the present invention will be described in detail with reference to preferred embodiments.

FIG. 1 is a cross-sectional view showing an adsorption apparatus according to an embodiment of the present invention. It is to be noted that in the following description, the upper side and the lower side in FIG. 1 will be referred to as "inflow side" and "outflow side", respectively.

In this regard, the term "inflow side" means the side on which a liquid such as a sample or an eluant is fed into the adsorption apparatus according to the present invention to separate and purify an object compound. On the other hand, the term "outflow side" means the side opposite to the "inflow side", that is, the side on which the liquid flows out of the adsorption apparatus according to the present invention.

The adsorption apparatus 1 shown in FIG. 1 includes a column 2, a particulate adsorbent 3, and two filter members 4 and 5.

The column 2 is composed of a column body 21 and caps (that is, covers) 22 and 23 attached to the inflow side end and the outflow side end of the column body 21, respectively.

The column body 21 is formed from, e.g., a hollow cylindrical member. Examples of a constituent material for each of the components (members) constituting the column 2 (that is, the column body 21 and other components) include various glass materials, various resin materials, various metallic materials, and various ceramic materials, etc.

The column body 21 has an inflow side opening and an outflow side opening, and these openings are covered with the filter members 4 and 5, respectively. In such a state, the caps 22 and 23 are threadedly attached to the inflow side end and the outflow side end of the column body 21, respectively.

The column 2 of such a structure has an adsorbent filling space 20 defined by the column body 21 and the filter members 4 and 5. This adsorbent filling space 20 is filled with the adsorbent 3 at least partially (in the present embodiment, substantially fully).

The liquid-tightness of the column body 21 is ensured by attaching the caps 22 and 23 to the column body 21.

An inlet pipe 24 and an outlet pipe 25 are liquid-tightly attached (fixed) to substantially middle portions of the caps 22 and 23, respectively. Through the inlet pipe 24 and the filter member 4, a liquid such as a sample or an eluant is fed to the adsorbent 3. The liquid fed to the adsorbent 3 passes through pore spaces (gaps) between particles of the adsorbent 3. Then, the resulting liquid passes through the filter member 5 and the outlet pipe 25, and then flows out of the column 2. As a result, components (compounds) contained in the sample are separated from one another according to the differences in their adsorbabilities to the adsorbent 3.

Each of the filter members 4 and 5 has the function of preventing the discharge of the adsorbent 3 from the adsorbent filling space 20. These filter members 4 and 5 are formed of, for example, nonwoven fabrics, foams (sponge-like porous bodies having interconnected pores), woven fabrics, or meshes made of synthetic resins such as polyurethane, polyvinyl alcohol, polypropylene, polyetherpolyamide, polyethyleneterephthalate, and polybutyleneterephthalate.

Features of the present invention reside in the adsorbent 3 filled in the adsorbent filling space 20, which features will be described in detail below.

At least a surface and its vicinity of the adsorbent 3 (that is, each particle of the adsorbent 3) is comprises an apatite, and more preferably mainly comprises (e.g., greater than about 50%) an apatite represented by the following formula (I):

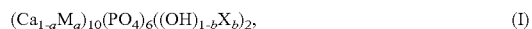

$$(Ca_{1-a}M_a)_{10}(PO_4)_6((OH)_{1-b}X_b)_2, \tag{I}$$

where the M represents at least one kind of rare earth metal elements, the X represents at least one kind of halogen elements, $0 < a \leq 1$, and $0 \leq b \leq 1$.

The apatite is prepared by substituting at least a part of Ca by the M. This ensures that an object compound having a portion capable of bonding to the M with a high affinity (i.e., with a high bonding force) is specifically bonded to the adsorbent 3. As a result, the adsorbent 3 can exhibit selectivity with respect to a compound having a portion capable of bonding to the M with a higher affinity than other compounds.

Further, in this adsorbent 3, the M serving as an adsorption site is substituted for Ca and introduced into a crystal lattice of the apatite. Accordingly, the M is firmly retained on the adsorbent 3 and is prevented from being separated from the adsorbent 3. This precludes the M (or its ions) from being admixed into the liquid eluted out of the column (adsorption apparatus 1), thereby maintaining the adsorbability of the adsorbent 3 for an extended period of time.

In this connection, examples of a compound to be specifically adsorbed (bonded) to the M include a compound having at least two noncovalent electron pairs. This kind of compound forms a coordinate bond (chelate) with the M at its portion (e.g., a substituent group or a side chain) having the two noncovalent electron pairs. The coordinate bond is stronger than an ordinary adsorption (e.g., electrical bond). Thus, use of the adsorbent 3 composed of the apatite with at least a part of Ca thereof being substituted by the M ensures that the above-noted compound is reliably adsorbed and separated from other compounds for the purpose of purification (isolation).

Various kinds of compounds having at least two noncovalent electron pairs are known in the art, but a sulfur-containing amino acid, a heterocyclic amino acid, and a polypeptide having such amino acids as amino acid residues exhibit an excellent ability to form a chelate with the M. In other words, the adsorbent 3 shows a high specific adsorbability with respect to one or more of the sulfur-containing amino acid, the heterocyclic amino acid, and the polypeptide having such amino acids as amino acid residues.

Among these compounds, cysteine belonging to the sulfur-containing amino acid and histidine or tryptophan belonging to the heterocyclic amino acid are extremely excellent in their ability to form a chelate with the M. Therefore, the adsorbent 3 (adsorption apparatus 1) is very suitable for use in separating and purifying the amino acids or the polypeptides (proteins) having a large number of such amino acids as its amino acid residues. Practical examples of these proteins include myoglobin and recombinant proteins in which a polypeptide with a plural number of cysteine, histidine or tryptophan is introduced (added) as a tag.

Examples of the M include Sc, Y and lanthanide-based metal elements, one or more of which may be selected properly. In this regard, examples of the lanthanide-based metal elements include La, Ce, Pr, Nd, Pm, Sm, Eu, Gd, Tb, Dy, Ho, Er, Tm, Lu and misch metal, and at least one of these elements may be preferably used as the M. The lanthanide-based metal elements are easily substituted for Ca of the apatite and efficiently introduced into a crystal lattice of the apatite. Furthermore, the lanthanide-based metal elements exhibit a very high affinity with the amino acids noted above and, therefore, is capable of adsorbing the amino acids or those proteins having such amino acids as their amino acid residues in a highly accurate manner.

Particularly, it is more preferable that the M be a lanthanide-based metal element mainly comprising (e.g., greater than about 50%) Sm. The adsorption effect set forth above is remarkably enhanced if Ca of the apatite is substituted by Sm.

In the event that Ca is mostly substituted by Sm, the substitution ratio is preferably no less than 70% with respect to the total of the M, and more preferably no less than 80%. This makes the characteristics (properties) of Sm become more outstanding.

The a in the formula (I), i.e., the substitution ratio of the M is not particularly limited but may preferably be as great as possible. Specifically, the a is preferably in the range of about 0.5 to 1, and more preferably in the range of about 0.7 to 1. If the a is too small, there is a likelihood that the adsorbent 3 may not be sufficiently given the specific adsorbability for the afore-mentioned compounds, depending on the kind or the like of the M.

Further, the apatite represented by the formula (I) may have non-substituted hydroxyl groups, but it is preferred that at least a part of the hydroxyl groups is substituted by a halogen group (halogen element X). This enhances the bonding force between the respective elements (ions) constituting the apatite, thus improving the durability and the solvent resistance (particularly, acid resistance) of the apatite (adsorbent 3).

The X may be properly selected from one or more of F, Cl, Br, I and At, but it is preferred that the X is mainly comprising (e.g., greater than about 50%) F. A fluoride ion has a higher electronegativity than other halide ion's. Therefore, the above-noted effect can be further improved by substituting at least a part of the hydroxyl groups with fluoro groups.

In the event that the hydroxyl groups are mainly substituted by F, the substitution ratio is preferably no less than 80% with respect to the total of the X, and more preferably no less than 90%. This makes the characteristics (properties) of F become more outstanding.

The b in the formula (I), i.e., the substitution ratio of the X is not subject to any particular limitation, but may preferably be as great as possible. Specifically, the b is preferably in the range of about 0.3 to 1, and more preferably in the range of about 0.5 to 1. If the b is too small, there is a likelihood that the durability or the solvent resistance of the adsorbent 3 may not be sufficiently improved, depending on the kind or the like of the X.

In this embodiment, it is preferred that the adsorbent 3 described above is of a particulate form (granular form) in its shape as shown in FIG. 1, but may have other forms such as a pellet-like form (small clod form) and a block form (e.g., a porous body whose adjacent pores are interconnected with each other or a honeycomb form). The adsorbent 3 of a particulate form has an increased surface area, and thus it is possible to increase an adsorption amount of the afore-mentioned compounds.

The average particle size of the particulate adsorbent 3 is not subject to any particular limitation, but may preferably be in the range of about 0.5 to 150 μm, and more preferably in the range of about 1 to 40 μm. Use of the adsorbent 3 having such an average particle size makes sure that the adsorbent 3 has a sufficiently great surface area while the filter member 5 is surely prevented from clogging.

The adsorbent 3 is comprised of the apatite represented by the above formula (I). In this case, the entirety of the adsorbent 3 may be comprised of the apatite mentioned above, but in the present invention it is sufficient that at least the surface the adsorbent (3) (that is, at least the surface of each particle of the adsorbent (3)) and its vicinity are comprised of the apatite mentioned above.

Further, in the case where the adsorbent filling space 20 is substantially fully filled with the adsorbent 3 as in the present embodiment, it is preferred that the adsorbent 3 has substantially identical composition throughout the adsorbent filling space 20. This makes the adsorption apparatus 1 particularly excellent in its ability to separate and purify the compounds noted above.

Further, the adsorbent 3 may be filled into only a part of the adsorbent filling space 20 (e.g., the part adjacent to the inlet pipe 24) and the remaining part of the adsorbent filling space 20 may be filled with other kinds of adsorbents.

Such an adsorption apparatus 1 can be manufactured by, e.g., the following methods I and II.

I: a method wherein a solution containing ions of at least one kind of rare earth metal elements is passed through the adsorbent filling space 20 of the column 2 filled with an apatite powder represented by the formula $Ca_{10}(PO_4)_6((OH)_{1-b}X_b)_2$, where $0 \leq b \leq 1$.

II: a method wherein a solution containing ions of at least one kind of rare earth metal elements and a solution containing ions of at least one kind of halogen elements are passed, one after another or substantially at the same time, through the adsorbent filling space 20 of the column 2 filled with an apatite powder (hydroxyapatite powder) represented by the formula $Ca_{10}(PO_4)_6(OH)_2$.

According to the methods I and II noted above, at least a part of the surface and its vicinity (preferably, substantially the entirety of the surface and its vicinity) of the apatite powder can be changed to the apatite represented by the afore-mentioned formula (I) with ease and within a shortened period of time, to thereby produce the adsorbent 3. In other words, it is possible for the methods I and II to manufacture the adsorption apparatus 1 in an easy and speedy manner.

As pointed out above, it is preferred in the adsorption apparatus 1 that the adsorbent 3 is substantially fully filled in the adsorbent filling space 20 and has a substantially identical structure (preferably, substantially identical composition throughout the adsorbent filling space 20). Use of the methods I and II described above offers an advantage in that it is possible to prevent any occurrence of variations in the structure (composition) of the adsorbent 3.

In the methods I and II, the content (concentration) of ions of the rare earth metal elements contained in 1 liter of the solution containing the ions of at least one kind of rare earth metal elements (hereinafter, referred to as "solution A") is preferably in the range of about 1 to 200 mol, and more preferably in the range of about 5 to 150 mol, based on 1 mol of the apatite powder filled in the adsorbent filling space 20. If the ion content is too small, there is a likelihood that the time required for substituting Ca of the apatite by the rare earth metal elements becomes unnecessarily prolonged due to the increase in the quantity of the solution used or other causes. On the other hand, even if the ion content is increased beyond the upper limit noted above, it cannot be expected that the efficiency of substituting Ca by the rare earth metal elements is further increased in proportion thereto.

The total pass-through quantity of the solution A is not subject to any particular limitation but may preferably be in the range of about 1 to 50 mL, and more preferably in the range of about 5 to 30 mL, in the case that the content of ions of the rare earth elements is within the above range. If the total pass-through quantity of the solution A is too small, there is a likelihood that Ca of the apatite is not sufficiently substituted by the rare earth metal elements, depending on the content of ions of the rare earth metal elements or other conditions. Even if the total pass-through quantity of the solution A is increased beyond the upper limit, it cannot be expected that the efficiency of substituting Ca by the rare earth metal elements is further increased in proportion thereto. Instead, the time required for substituting Ca of the apatite by the rare earth metal elements would be unnecessarily prolonged.

The flow rate of the solution A is preferably in the range of about 0.1 to 10 mL/min, and more preferably in the range of about 1 to 5 mL/min. If the flow rate is too low, the time required for substituting Ca of the apatite by the rare earth metal elements becomes unnecessarily prolonged. If the flow rate is too high, there may be such an instance that Ca is not sufficiently substituted by the rare earth metal elements, depending on the content of ions of the rare earth metal elements or other conditions.

In the method II, the content (concentration) of ions of the halogen elements contained in 1 liter of the solution containing the ions of at least one kind of the halogen elements (hereinafter, referred to as "solution B") is preferably in the range of about 0.2 to 200 mol, and more preferably in the range of about 1 to 150 mol, based on 1 mol of the apatite powder filled in the adsorbent filling space 20. If the ion content is too small, there is a likelihood that the time required for substituting hydroxyl groups of the apatite by halogen groups becomes unnecessarily prolonged due to the increase in the quantity of the solution used or other causes. Even if the ion content is increased beyond the upper limit noted above, it cannot be expected that the efficiency of substituting the hydroxyl groups by the halogen groups is increased in proportion thereto.

The total pass-through quantity of the solution B is not subject to any particular limitation but may preferably be in the range of about 1 to 50 mL, and more preferably in the range of about 5 to 30 mL, in the case that the content of ions of the halogen elements is within the above range. If the total pass-through quantity of the solution B is too small, there is a likelihood that the hydroxyl groups of the apatite are not sufficiently substituted by the halogen groups, depending on the content of ions of the halogen elements or other conditions. On the other hand, even if the total pass-through quantity of the solution B is increased beyond the upper limit, it cannot be expected that the efficiency of substituting the hydroxyl groups by the halogen groups is further increased in proportion thereto. Instead, the time required for substituting the hydroxyl groups of the apatite by the halogen groups would be unnecessarily prolonged.

The flow rate of the solution B is preferably in the range of about 0.1 to 10 mL/min, and more preferably in the range of about 1 to 5 mL/min. If the flow rate is too low, the time required for substituting the hydroxyl groups of the apatite by the halogen groups becomes unnecessarily prolonged. On the other hand, if the flow rate is too high, there may be such an instance that the hydroxyl groups are not sufficiently substituted by the halogen groups, depending on the content of ions of the halogen elements or other conditions.

Further, in the case where the solution A and the solution B are passed through the adsorbent filling space 20 substantially at the same time in the method II, the total pass-through quantity and the flow rate of the respective solutions can be set properly by referring to the preferable ranges of values employed in the preceding cases wherein the solutions A and B are independently passed through the adsorbent filling space 20 one after another.

According to the methods I and II, the substitution ratio of the apatite powder by the rare earth elements and the substitution ratio of the apatite powder by the halogen groups can be controlled to desired ones by appropriately setting the conditions of the solutions A and B (the ion content, the total pass-through quantity and the flow rate).

Further, in the methods I and II, the direction in which the solutions A and B are passed through is optional. Namely, for example, in the method I, a predetermined volume of the solution A may be passed through the adsorbent filling space 20 from the inflow side to the outflow side, after which another predetermined volume of the solution A may be passed through the adsorbent filling space 20 in a changed direction. Moreover, for example, in the method II, a predetermined volume of the solution A may be passed through the adsorbent filling space 20 from the inflow side to the out flow side, after which a predetermined volume of the solution B may be passed through the adsorbent filling space 20 in a changed direction. Further, such a pass-through operation may be repeated several times.

One representative example of a usage of the adsorption apparatus according to the present invention will now be described in respect of the case wherein a protein (polypeptide) is separated and purified.

First, a solution is prepared as a sample by dissolving plural kinds of proteins in a buffer solution. Then, the sample is fed to the adsorbent 3 through the inlet pipe 24 and the filter member 4 so that it can pass through the column 2. As a result, a component which is not adsorbed to the adsorbent 3 or a component (compound) having a low adsorbability flows out of the column 2 through the filter 5 and the outlet pipe 25. In contrast, a component having a high adsorbability to the adsorbent 3 is retained in the column 2.

In this connection, examples of the buffer solution usable for this purpose include a phosphate buffer solution, a Good's buffer, an imidazole buffer solution and the like.

Then, an eluant is fed through the inlet pipe 24 into the column 2, and the eluant is collected from the outlet pipe 25 of the column 2.

Examples of the eluant usable for this purpose include: a buffer solution containing a material (competitive reagent) having a higher adsorbability to the adsorbent 3 than the protein adsorbed to the adsorbent 3, a chelating agent, and the like; a buffer solution having a higher salt concentration than the buffer solution described above; and a buffer solution having a lower pH value (about pH 4.5 to 6) than the buffer solution described above. Further, the eluant may be fed into the column 2 (or passed through the adsorbent filling space 20) while changing the concentration of a solute with the lapse of time.

As the eluant comes into contact with the adsorbent 3, the protein adsorbed to the adsorbent 3 is removed from the adsorbent 3 and then admixed into the eluant, after which the protein is collected in a mixed condition with the eluant discharged from the outlet pipe 25.

Although an adsorbent, an adsorption apparatus, and a method for manufacturing the adsorption apparatus according to the present invention have been described hereinabove, it should be noted that the present invention is not limited thereto.

EXAMPLES

Next, actual examples of the present invention will be described.

1. Manufacture of Adsorption Apparatus

In each of the following Examples 1 to 20 and Comparative Example 1, five adsorption apparatuses were manufactured.

Example 1

Hydroxyapatite was synthesized by a well-known wet synthesis method to obtain a hydroxyapatite slurry.

The hydroxyapatite slurry was spray-dried to obtain a powder having an average particle size of 40 μm. Then, the powder was sintered at 700° C. for 4 hours in the atmosphere.

The hydroxyapatite powder was suspended in a 10 mM phosphate buffer solution, and an adsorbent filling space of a column (inner diameter 4 mm×length 100 mm) was filled with the suspension.

The amount of the hydroxyapatite powder filled in the adsorbent filling space was 1 g (about 1 mmol).

Subsequently, a 100 mM $SmCl_2$ solution was fed through an inlet pipe into the column at a flow rate of 1 mL/min for 10 minutes to substitute Ca contained in the hydroxyapatite powder by Sm. In this way, an adsorbent was obtained and then adsorption apparatuses were manufactured.

It was confirmed by an elemental analysis method that most of Ca in the hydroxyapatite on the surface of each particle of the adsorbent was substituted by Sm.

The elemental analysis method was performed through the use of an elemental analysis device ("Ion Chromato HIC-SP", manufactured by Shimadzu Corporation).

Example 2

Adsorption apparatuses were manufactured in the same manner as in the Example 1, except that a 100 mM $SmCl_2$ solution was fed through an inlet pipe into a column at a flow rate of 1 mL/min for 10 minutes and, thereafter, a 100 mM hydrogen fluoride (HF) aqueous solution was fed at a flow rate of 1 mL/min for 10 minutes.

It was confirmed by the same elemental analysis method as set forth in the Example 1 that most of Ca in the hydroxyapatite on the surface of each particle of the adsorbent was substituted by Sm and most of OH was substituted by F.

Example 3

Fluoroapatite ($Ca_{10}(PO_4)_6((OH)_{0.7}F_{0.3})_2$) was synthesized by a well-known wet synthesis method to obtain a fluoro apatite slurry.

The fluoroapatite slurry was spray-dried to obtain a powder having an average particle size of 40 µm. Then, the powder was sintered at 700° C. for 4 hours in the atmosphere.

Adsorption apparatuses were manufactured in the same manner as in the Example 1 using the fluoroapatite powder.

It was confirmed by the same elemental analysis method as set forth in the Example 1 that most of Ca in the fluoroapatite on the surface of each particle of the adsorbent was substituted by Sm.

Example 4

Adsorption apparatuses were manufactured in the same manner as in the Example 3, except that a 100 mM $SmCl_2$ solution was fed through an inlet pipe into a column at a flow rate of 1 mL/min for 5 minutes.

It was confirmed by the same elemental analysis method as set forth in the Example 1 that about 60% of Ca in the fluoroapatite on the surface of each particle of the adsorbent was substituted by Sm.

Example 5

Adsorption apparatuses were manufactured in the same manner as in the Example 1, except that a 100 mM $EuCl_2$ solution was used in place of the 100 mM $SmCl_2$ solution.

It was confirmed by the same elemental analysis method as set forth in the Example 1 that most of Ca in the hydroxyapatite on the surface of each particle of the adsorbent was substituted by Eu.

Example 6

Adsorption apparatuses were manufactured in the same manner as in the Example 1, except that a 100 mM hydrogen fluoride aqueous solution was fed through an inlet pipe into a column at a flow rate of 1 mL/min for 10 minutes and, thereafter, a 100 mM $EuCl_2$ solution was fed at a flow rate of 1 mL/min for 10 minutes.

It was confirmed by the same elemental analysis method as set forth in the Example 1 that most of Ca in the hydroxyapatite on the surface of each particle of the adsorbent was substituted by Eu and most of OH was substituted by F.

Example 7

Adsorption apparatuses were manufactured in the same manner as in the Example 5, except that a fluoroapatite ($Ca_{10}(PO_4)_6((OH)_{0.5}F_{0.5})_2$) powder synthesized by a well-known wet synthesis method was used in place of the hydroxyapatite.

It was confirmed by the same elemental analysis method as set forth in the Example 1 that most of Ca in the fluoroapatite on the surface of each particle of the adsorbent was substituted by Eu.

Example 8

Adsorption apparatuses were manufactured in the same manner as in the Example 1, except that a 100 mM $DyCl_3$ solution was used in place of the 100 mM $SmCl_2$ solution.

It was confirmed by the same elemental analysis method as set forth in the Example 1 that most of Ca in the hydroxyapatite on the surface of each particle of the adsorbent was substituted by Dy.

Example 9

Adsorption apparatuses were manufactured in the same manner as in the Example 1, except that a mixed solution obtained by mixing a 100 mM $DyCl_3$ solution with a 100 mM hydrogen fluoride aqueous solution in a volume ratio of 50:50 was fed through an inlet pipe into a column at a flow rate of 1 mL/min for 20 minutes.

It was confirmed by the same elemental analysis method as set forth in the Example 1 that most of Ca in the hydroxyapatite on the surface of each particle of the adsorbent was substituted by Dy and most of OH was substituted by F.

Example 10

Adsorption apparatuses were manufactured in the same manner as in the Example 8, except that a fluoroapatite ($Ca_{10}(PO_4)_6((OH)_{0.3}F_{0.7})_2$) powder synthesized by a well-known wet synthesis method was used in place of the hydroxyapatite.

It was confirmed by the same elemental analysis method as set forth in the Example 1 that most of Ca in the fluoroapatite on the surface of each particle of the adsorbent was substituted by Dy.

Example 11

Adsorption apparatuses were manufactured in the same manner as in the Example 1, except that a 100 mM $YCl_3$ solution was used in place of the 100 mM $SmCl_2$ solution.

It was confirmed by the same elemental analysis method as set forth in the Example 1 that most of Ca in the hydroxyapatite on the surface of each particle of the adsorbent was substituted by Y.

Example 12

Adsorption apparatuses were manufactured in the same manner as in the Example 1, except that a mixed solution obtained by mixing a 100 mM $YCl_3$ solution with a 100 mM hydrogen fluoride aqueous solution in a volume ratio of 50:50 was fed through an inlet pipe into a column at a flow rate of 2 mL/min for 10 minutes.

It was confirmed by the same elemental analysis method as set forth in the Example 1 that most of Ca in the hydroxyapatite on the surface of each particle of the adsorbent was substituted by Y and most of OH was substituted by F.

Example 13

Adsorption apparatuses were manufactured in the same manner as in the Example 11, except that a fluoroapatite ($Ca_{10}(PO_4)_6((OH)_{0.1}F_{0.9})_2$) powder synthesized by a well-known wet synthesis method was used in place of the hydroxyapatite.

It was confirmed by the same elemental analysis method as set forth in the Example 1 that most of Ca in the fluoroapatite on the surface of each particle of the adsorbent was substituted by Y.

Example 14

Adsorption apparatuses were manufactured in the same manner as in the Example 13, except that a 100 mM $YCl_3$ solution was fed through an inlet pipe into a column at a flow rate of 1 mL/min for 7 minutes.

It was confirmed by the same elemental analysis method as set forth in the Example 1 that about 90% of Ca in the fluoroapatite on the surface of each particle of the adsorbent was substituted by Y.

Example 15

Adsorption apparatuses were manufactured in the same manner as in the Example 2, except that a mixed solution obtained by mixing a 100 mM $SmCl_2$ solution with a 100 mM $EuCl_2$ solution in a volume ratio of 75:25 was used in place of the 100 mM $SmCl_2$ solution.

It was confirmed by the same elemental analysis method as set forth in the Example 1 that most of Ca in the hydroxyapatite on the surface of each particle of the adsorbent was substituted by Sm and Eu (Sm:Eu=80:20), and most of OH was substituted by F.

Example 16

Adsorption apparatuses were manufactured in the same manner as in the Example 2, except that a mixed solution obtained by mixing a 100 mM $SmCl_2$ solution with a 100 mM $DyCl_3$ solution in a volume ratio of 65:35 was used in place of the 100 mM $SmCl_2$ solution.

It was confirmed by the same elemental analysis method as set forth in the Example 1 that most of Ca in the hydroxyapatite on the surface of each particle of the adsorbent was substituted by Sm and Dy (Sm:Dy=70:30) and most of OH was substituted by F.

Example 17

Adsorption apparatuses were manufactured in the same manner as in the Example 2, except that a mixed solution obtained by mixing a 100 mM $SmCl_2$ solution with a 100 mM $NdCl_3$ solution in a volume ratio of 50:50 was used in place of the 100 mM $SmCl_2$ solution.

It was confirmed by the same elemental analysis method as set forth in the Example 1 that most of Ca in the hydroxyapatite on the surface of each particle of the adsorbent was substituted by Sm and Nd (Sm:Nd=60:40) and most of OH was substituted by F.

Example 18

Adsorption apparatuses were manufactured in the same manner as in the Example 2, except that a mixed solution obtained by mixing a 100 mM $SmCl_2$ solution with a 100 mM $PrCl_3$ solution in a volume ratio of 40:60 was used in place of the 100 mM $SmCl_2$ solution.

It was confirmed by the same elemental analysis method as set forth in the Example 1 that most of Ca in the hydroxyapatite on the surface of each particle of the adsorbent was substituted by Sm and Pr (Sm:Pr=50:50) and most of OH was substituted by F.

Example 19

Adsorption apparatuses were manufactured in the same manner as in the Example 1, except that a mixed solution obtained by mixing a 100 mM $EuCl_2$ solution with a 100 mM $DyCl_3$ solution in a volume ratio of 50:50 was fed through an inlet pipe into a column at a flow rate of 1 mL/min for 5 minutes and, thereafter, a mixed solution obtained by mixing a 100 mM aqueous HF solution with a 100 mM aqueous HCl solution in a volume ratio of 85:15 was fed through the inlet pipe into the column at a flow rate of 1 mL/min for 10 minutes.

It was confirmed by the same elemental analysis method as set forth in the Example 1 that about 60% of Ca in the hydroxyapatite on the surface of each particle of the adsorbent was substituted by Eu and Dy (Ca:Eu:Dy=40:30:30) and most of OH was substituted by F and Cl (F:Cl=90:10).

Example 20

Adsorption apparatuses were manufactured in the same manner as in the Example 1, except that a mixed solution obtained by mixing a 100 mM $YCl_3$ solution with a 100 mM $DyCl_3$ solution in a volume ratio of 60:40 was fed through an inlet pipe into a column at a flow rate of 1 mL/min for 6 minutes and, thereafter, a mixed solution obtained by mixing a 100 mM aqueous HF solution with a 100 mM aqueous HCl solution in a volume ratio of 75:25 was fed through the inlet pipe into the column at a flow rate of 1 mL/min for 10 minutes.

It was confirmed by the same elemental analysis method as set forth in the Example 1 that about 80% of Ca in the hydroxyapatite on the surface of each particle of the adsorbent was substituted by Y and Dy (Ca:Y:Dy=20:40:40) and most of OH was substituted by F and Cl (F:Cl=80:20).

Comparative Example 1

Adsorption apparatuses were manufactured in the same manner as in the Example 1, except that the operation of substituting Ca contained in the hydroxyapatite powder by Sm was omitted.

Shown in Table 1 are the compositions of apatites at the surface and its vicinity of the respective particles of the adsorbents obtained in each of the Examples and the Comparative Example.

TABLE 1

| | Composition of Apatite | | |
|---|---|---|---|
| Ex. 1 | $Sm_{10}$ | $(PO_4)_6$ | $OH_2$ |
| Ex. 2 | $Sm_{10}$ | $(PO_4)_6$ | $F_2$ |
| Ex. 3 | $Sm_{10}$ | $(PO_4)_6$ | $(OH_{0.7}F_{0.3})_2$ |
| Ex. 4 | $(Ca_{0.4}Sm_{0.6})_{10}$ | $(PO_4)_6$ | $(OH_{0.7}F_{0.3})_2$ |
| Ex. 5 | $Eu_{10}$ | $(PO_4)_6$ | $OH_2$ |
| Ex. 6 | $Eu_{10}$ | $(PO_4)_6$ | $F_2$ |
| Ex. 7 | $Eu_{10}$ | $(PO_4)_6$ | $(OH_{0.5}F_{0.5})_2$ |
| Ex. 8 | $Dy_{10}$ | $(PO_4)_6$ | $OH_2$ |
| Ex. 9 | $Dy_{10}$ | $(PO_4)_6$ | $F_2$ |
| Ex. 10 | $Dy_{10}$ | $(PO_4)_6$ | $(OH_{0.3}F_{0.7})_2$ |
| Ex. 11 | $Y_{10}$ | $(PO_4)_6$ | $OH_2$ |
| Ex. 12 | $Y_{10}$ | $(PO_4)_6$ | $F_2$ |
| Ex. 13 | $Y_{10}$ | $(PO_4)_6$ | $(OH_{0.1}F_{0.9})_2$ |
| Ex. 14 | $(Ca_{0.1}Y_{0.9})_{10}$ | $(PO_4)_6$ | $(OH_{0.1}F_{0.9})_2$ |
| Ex. 15 | $(Sm_{0.8}Eu_{0.2})_{10}$ | $(PO_4)_6$ | $F_2$ |
| Ex. 16 | $(Sm_{0.7}Dy_{0.3})_{10}$ | $(PO_4)_6$ | $F_2$ |
| Ex. 17 | $(Sm_{0.6}Nd_{0.4})_{10}$ | $(PO_4)_6$ | $F_2$ |
| Ex. 18 | $(Sm_{0.5}Pr_{0.5})_{10}$ | $(PO_4)_6$ | $F_2$ |
| Ex. 19 | $(Ca_{0.4}(Eu_{0.5}Dy_{0.5})_{0.6})_{10}$ | $(PO_4)_6$ | $(F_{0.9}Cl_{0.1})_2$ |
| Ex. 20 | $(Ca_{0.2}(Y_{0.5}Dy_{0.5})_{0.8})_{10}$ | $(PO_4)_6$ | $(F_{0.8}Cl_{0.2})_2$ |
| Com. Ex. 1 | $Ca_{10}$ | $(PO_4)_6$ | $OH_2$ |

2. Evaluation
2-1 Protein Adsorption Characteristics

In the manner as set forth below, protein adsorption characteristics were examined for the respective adsorption apparatuses manufactured in the Examples 1 to 20 and the Comparative Example 1.

First, the solution filled in the column of the adsorption apparatus was replaced with a 10 mM phosphate buffer solution (pH 6.8).

Then, a sample was prepared by dissolving myoglobin (a protein containing a large number of histidines as amino acid residues), α-chymotrypsinogen A and chitochrome C in the phosphate buffer solution noted above so that they can have the concentrations of 50 mg/mL, respectively. Then, 2 mL of the thus prepared resulting sample was supplied to and passed through the column.

Next, 400 mM of the phosphate buffer solution (pH 6.8) was fed into the column at a flow rate of 1 mL/min for 15 minutes and, then the phosphate buffer solution eluted out of the column was collected.

Thereafter, the concentration of each of the proteins in the collected phosphate buffer solution was measured in order to calculate the protein adsorption amount per 1 g of the adsorbent. In measuring the protein adsorption amount, a UV/Vis detector ("QuadTec", manufactured by Biorad Corporation) was used.

The results are shown in Table 2. Each of the values in Table 2 is the average value of the five adsorption apparatuses manufactured in each of the Examples and the Comparative Example.

TABLE 2

| | Protein Adsorption Amount [mg/g] | | |
| --- | --- | --- | --- |
| | myoglobin | α-chymotrypsinogen A | chitochrome C |
| Ex. 1 | 72 | 18 | 25 |
| Ex. 2 | 73 | 23 | 24 |
| Ex. 3 | 72 | 25 | 25 |
| Ex. 4 | 69 | 19 | 23 |
| Ex. 5 | 68 | 25 | 25 |
| Ex. 6 | 67 | 24 | 24 |
| Ex. 7 | 68 | 20 | 22 |
| Ex. 8 | 65 | 23 | 26 |
| Ex. 9 | 65 | 24 | 24 |
| Ex. 10 | 64 | 20 | 25 |
| Ex. 11 | 62 | 24 | 24 |
| Ex. 12 | 63 | 25 | 26 |
| Ex. 13 | 60 | 26 | 23 |
| Ex. 14 | 61 | 26 | 23 |
| Ex. 15 | 72 | 26 | 23 |
| Ex. 16 | 70 | 26 | 23 |
| Ex. 17 | 68 | 26 | 23 |
| Ex. 18 | 68 | 26 | 23 |
| Ex. 19 | 65 | 26 | 23 |
| Ex. 20 | 63 | 26 | 23 |
| Com. Ex. 1 | 15 | 19 | 25 |

As shown in Table 2, the adsorption apparatuses manufactured in each of the Examples adsorbed myoglobin more efficiently (with higher selectivity) than α-chymotrypsinogen A and chitochrome C. Especially, the adsorption apparatuses (Examples 1 to 3, 15 and 16) filled with the adsorbent containing no less than 70% of Sm with respect to the total amount of rare earth metal elements had a tendency to adsorb myoglobin in a greater amount.

Further, little elution of rare earth metal elements was recognized in each of the phosphate buffer solutions collected from the adsorption apparatuses of the respective Examples. The confirmation of elution of rare earth metal elements was conducted by an atomic absorption method through the use of an atomic absorption spectrometer ("AA-6200", manufactured by Shimadzu Corporation).

In contrast, the adsorption apparatuses of the Comparative Example 1 did not specifically adsorb myoglobin, as compared to the adsorption apparatuses of the respective Examples. Further, in the adsorption apparatuses of the Comparative Example 1, the difference in the adsorbability depending on the kinds of proteins was not so conspicuous as in the adsorption apparatuses of the respective Examples.

2-2 Amino Acid Adsorption Characteristics

In the manner as set forth below, amino acid adsorption characteristics were examined for the respective adsorption apparatuses manufactured in the Examples 1 to 20 and the Comparative Example 1.

First, the solution filled in the column of each of the adsorption apparatuses was replaced with a 1 mM phosphate buffer solution (pH 6.8).

Then, samples were prepared by dissolving each of glycine, arginine, lysine, cysteine, histidine and tryptophan in the phosphate buffer solution noted above so that its concentration became 1 mg/mL, respectively.

Next, each of the samples (one kind) was fed into the column at a flow rate of 1 mL/min, after which the phosphate buffer solution was eluted out of the column with a gradient of 10 mM to 300 mM over 15 minutes to collect the sample.

Further, the retention time taken to detect amino acids in each of the collected samples was measured. The detection of the amino acids was conducted by measuring a light absorbance at 195 nm.

The above-mentioned operation was performed one after another for the respective samples.

The results are shown in Table 3. Each of the values in Table 3 is the average value of the five adsorption apparatuses manufactured in each of the Examples and the Comparative Example.

TABLE 3

| | Elution Times of Amino Acids (retention time)[min] | | | | | |
| --- | --- | --- | --- | --- | --- | --- |
| | glycine | arginine | lysine | cysteine | histidine | tryptophan |
| Ex. 1 | 2.2 | 2.1 | 2.1 | 6.3 | 6.1 | 6.3 |
| Ex. 2 | 2.2 | 2.2 | 2.1 | 6.2 | 6.3 | 6.2 |
| Ex. 3 | 2.4 | 2.2 | 2.2 | 6.2 | 6.2 | 6.2 |
| Ex. 4 | 2.3 | 2.2 | 2.1 | 6.0 | 5.9 | 5.9 |
| Ex. 5 | 2.2 | 2.2 | 2.3 | 4.2 | 4.2 | 4.1 |
| Ex. 6 | 2.2 | 2.4 | 2.3 | 4.1 | 4.1 | 4.0 |
| Ex. 7 | 2.2 | 2.4 | 2.1 | 4.2 | 4.3 | 4.1 |
| Ex. 8 | 2.2 | 2.0 | 2.2 | 3.3 | 3.4 | 3.5 |
| Ex. 9 | 2.1 | 2.2 | 2.2 | 3.5 | 3.5 | 3.4 |
| Ex. 10 | 2.1 | 2.0 | 2.2 | 3.4 | 3.5 | 3.4 |
| Ex. 11 | 2.3 | 2.3 | 2.2 | 3.3 | 3.1 | 3.1 |
| Ex. 12 | 2.4 | 2.3 | 2.1 | 3.2 | 3.2 | 3.2 |
| Ex. 13 | 2.0 | 2.2 | 2.2 | 3.2 | 3.3 | 3.1 |
| Ex. 14 | 2.0 | 2.2 | 2.2 | 3.3 | 3.2 | 3.3 |
| Ex. 15 | 2.0 | 2.1 | 2.2 | 6.1 | 6.2 | 6.2 |
| Ex. 16 | 2.0 | 2.2 | 2.2 | 6.0 | 6.0 | 6.0 |
| Ex. 17 | 2.0 | 2.1 | 2.2 | 5.9 | 5.8 | 6.0 |
| Ex. 18 | 2.0 | 2.2 | 2.2 | 5.8 | 5.6 | 5.7 |
| Ex. 19 | 2.0 | 2.2 | 2.2 | 4.0 | 4.0 | 4.1 |
| Ex. 20 | 2.0 | 2.2 | 2.2 | 3.6 | 3.4 | 3.3 |
| Com. Ex. 1 | 2.2 | 2.1 | 2.3 | 2.3 | 2.2 | 2.4 |

As shown in Table 3, in the adsorption apparatuses manufactured in each of the Examples, elution times of cysteine, histidine and tryptophan were remarkably longer than those of the adsorption apparatuses of the Comparative Example 1. Especially, the adsorption apparatuses (Examples 1 to 3, 15 and 16) filled with the adsorbent containing no less than 70% of Sm with respect to the total of rare earth metal elements had a tendency to exhibit prolonged elution times of the amino acids.

On the contrary, no difference in the elution times of glycine, arginine and lysine was recognized in the adsorption apparatuses of the respective Examples and the Comparative Example.

The above results indicate that the adsorption apparatuses of the respective Examples had a specific adsorbability for cysteine, histidine and tryptophan.

Further, little elution of rare earth metal elements was recognized in the phosphate buffer solutions collected from the adsorption apparatuses of the respective Examples. The confirmation of elution of rare earth metal elements was conducted by an atomic absorption method through the use of an atomic absorption spectrometer ("AA-6200", manufactured by Shimadzu Corporation).

As described above, the adsorption apparatuses of the respective Examples (according to the present invention) are particularly excellent in their specific adsorbability for histidine and, therefore, are very suitable for use in separating and purifying, for example, recombinant proteins in which a polypeptide made of histidine is introduced (added) as a tag.

As described above, according to the present invention, the adsorbent can adsorb an object compound with increased selectivity. For this reason, it becomes possible to collect the object compound in a high yield and with an increased purity by constructing an adsorption apparatus with the use of the adsorbent according to the present invention.

Furthermore, due to the fact that rare earth metal elements, which serve as adsorbing (bonding) sites of an object compound, are introduced into a crystal lattice of an apatite of which the adsorbent is composed, the rare earth metal elements are prevented from separating from the adsorbent. This precludes the rare earth metal elements (or their ions) from being admixed into the liquid eluted out of a column, thus maintaining the adsorbability of the adsorbent for an extended period of time.

In addition, the kind of an object compound to be separated and purified can be selected by properly selecting the kind of rare earth metal elements that are substituted for Ca of an apatite. For example, if Sm is selected as one kind of the rare earth metal elements, it becomes possible to improve the histidine-specific adsorbability of the adsorbent.

Accordingly, use of an adsorption apparatus filled with the adsorbent of the present invention makes it possible to conduct the task of separating and purifying a recombinant protein having, e.g., a histidine tag, in a highly suitable manner.

Moreover, the adsorption apparatus described above can be manufactured easily within a shortened period of time, using the method for manufacturing an adsorption apparatus according to the present invention.

Finally, it is to be understood that many changes and additions may be made to the embodiments and examples described above without departing from the scope and spirit of the invention as defined in the following claims.

Further, it is also to be understood that the present disclosure relates to subject matter contained in Japanese Patent Application No. 2005-062990 (filed on Mar. 7, 2005) which is expressly incorporated herein by reference in its entirety.

What is claimed is:

1. An adsorbent usable in a column for a liquid chromatography, the adsorbent whose surface and its vicinity mainly comprise an apatite represented by the following formula (I):

$$(Ca_{1-a}M_a)_{10}(PO_4)_6((OH)_{1-b}X_b)_2, \quad (I)$$

wherein $0.5<a\leq1$, and $0\leq b\leq1$, the M represents at least one kind of rare earth metal element, and the X represents at least one kind of halogen element, wherein the adsorbent has a particulate form, and the average particle size of the adsorbent is in the range of 40 to 150 μm, and wherein the adsorbent selectively adsorbs a compound having at least two noncovalent electron pairs, and the compound is at least one kind of a sulfur-containing amino acid, a heterocyclic amino acid, and a polypeptide having amino acids as amino acid residues.

2. The adsorbent as claimed in claim 1, wherein the M is a rare earth metal element containing at least one kind of lanthanide-based metal element.

3. The adsorbent as claimed in claim 2, wherein the M comprises a lanthanide-based metal element mainly comprises Sm.

4. The adsorbent as claimed in claim 1, wherein the M comprises Sm and the ratio of Sm is no less than 70% to the total amount of the M.

5. The adsorbent as claimed in claim 1, wherein the X in the formula (I) is a halogen element mainly comprised of F.

6. The adsorbent as claimed in claim 1, wherein the X comprises F and the ratio of F is no less than 80% with respect to the total amount of the X.

7. The adsorbent as claimed in claim 1, wherein the b in the formula (I) is in the range of 0.3 to 1.

8. The adsorbent as claimed in claim 1, wherein the sulfur-containing amino acid is cysteine.

9. The adsorbent as claimed in claim 1, wherein the heterocyclic amino acid is histidine or tryptophan.

10. An adsorption apparatus comprising a column having an adsorbent filling space, and the adsorbent defined in claim 1 filled in at least a part of the adsorbent filling space.

11. The adsorption apparatus as claimed in claim 10, wherein the adsorbent filling space is substantially fully filled with the adsorbent.

12. The adsorption apparatus as claimed in claim 11, wherein the adsorbent has substantially identical composition in each part of the adsorbent filling space.

13. A method for manufacturing an adsorption apparatus, comprising the steps of:

preparing a column having an adsorbent filing space which is filled with an apatite represented by the formula $Ca_{10}(PO_4)_6((OH)_{1-b}X_b)_2$, where the X represents at least one kind of halogen elements and $0\leq b\leq1$ and, wherein the apatite has a particulate form, and the average particle size of the apatite is in the range of 40 to 150 μm;

preparing a solution containing ions of at least one kind of rare earth metal elements; and passing the solution through the adsorbent filling space of the column filled with the apatite to thereby make at least a part of a surface and its vicinity of the apatite have the following formula (I):

$$(Ca_{1-a}M_a)_{10}(PO_4)_6((OH)_{1-b}X_b)_2, \quad (I)$$

wherein $0.5<a\leq1$, and $0\leq b\leq1$, the M represents at least one kind of rare earth metal element, and the X represents at least one kind of halogen element.

14. A method for manufacturing an adsorption apparatus, comprising the steps of:

preparing a column having an adsorbent filing space which is filled with an apatite represented by the formula $Ca_{10}(PO_4)_6(OH)_2$, wherein the apatite has a particulate form, and the average particle size of the apatite is in the range of 40 to 150 μm;

preparing a solution containing ions of at least one kind of rare earth metal elements, and a solution containing ions of at least one kind of halogen elements; and passing the solutions through the adsorbent filling space of the column filled with the apatite one after another or substantially at the same time to thereby make at least a part of a surface and its vicinity of the apatite have the following formula (I):

$$(Ca_{1-a}M_a)_{10}(PO_4)_6((OH)_{1-b}X_b)_2, \qquad (I)$$

where the M represents at least one kind of rare earth metal element, the X represents at least one kind of halogen element, $0.5 < a \leq 1$, and $0 \leq b \leq 1$.

15. The method for manufacturing an adsorption apparatus as claimed in claim 14, wherein the amount of the halogen element ions contained in 1 litter of the solution containing the halogen element ions is in the range of 0.2 to 200 mol based on 1 mol of the apatite.

16. The method for manufacturing an adsorption apparatus as claimed in claim 14, wherein the total pass-through quantity of the solution containing the halogen element ions is in the range of 1 to 50 mL.

17. The method for manufacturing an adsorption apparatus as claimed in claim 14, wherein the flow rate of the solution containing the halogen element ions is in the range of 0.1 to 10 mL/min.

18. The method for manufacturing an adsorption apparatus as claimed in of claim 13, wherein the amount of the rare earth metal element ions contained in 1 litter of the solution containing the rare earth metal element ions is in the range of 1 to 200 mol based on 1 mol of the apatite.

19. The method for manufacturing an adsorption apparatus as claimed in claim 13, wherein the total pass-through quantity of the solution containing the rare earth metal element ions is in the range of 1 to 50 mL.

20. The method for manufacturing an adsorption apparatus as claimed in claim 13, wherein the flow rate of the solution containing the rare earth metal element ions is in the range of 0.1 to 10 mL/min.

21. The method for manufacturing an adsorption apparatus as claimed in of claim 14, wherein the amount of the rare earth metal element ions contained in 1 litter of the solution containing the rare earth metal element ions is in the range of 1 to 200 mol based on 1 mol of the apatite.

22. The method for manufacturing an adsorption apparatus as claimed in claim 14, wherein the total pass-through quantity of the solution containing the rare earth metal element ions is in the range of 1 to 50 mL.

23. The method for manufacturing an adsorption apparatus as claimed in claim 14, wherein the flow rate of the solution containing the rare earth metal element ions is in the range of 0.1 to 10 mL/min.

24. A method for manufacturing an adsorption apparatus, comprising the steps of:

preparing a column having an adsorbent filing space which is filled with an apatite represented by the formula $Ca_{10}(PO_4)_6((OH)_{1-b}X_b)_2$, where the X represents at least one kind of halogen element and $0.3 \leq b \leq 1$ and, wherein the apatite has a particulate form, and the average particle size of the apatite is in the range of 40 to 150 μm;

preparing a solution containing ions of at least one kind of rare earth metal elements; and passing the solution through the adsorbent filling space of the column filled with the apatite to thereby make at least a part of a surface and its vicinity of the apatite have the following formula (I):

$$(Ca_{1-a}M_a)_{10}(PO_4)_6((OH)_{1-b}X_b)_2, \qquad (I)$$

wherein $0.5 < a \leq 1$, and $0.3 \leq b \leq 1$, the M comprises Sm in a ratio no less than 70% to the total amount of the M, and the X represents at least one kind of halogen elements.

25. The adsorbent as claimed in claim 1, wherein $0.7 < a \leq 1$, and $0.5 \leq b \leq 1$, the M comprises Sm in a ratio no less than 70% to the total amount of the M, and the X represents at least one kind of halogen elements.

* * * * *